J. J. BATE.

REFRIGERATING CARS.

No. 7,279. Reissued Aug. 29, 1876.

WITNESSES

A. B. Robertson

W. W. Hollingsworth

INVENTOR

John J Bate by T. W. Robertson

ATTORNEY

N. PETERS, Photo-Lithographer, Washington, D. C.

UNITED STATES PATENT OFFICE.

JOHN J. BATE, OF BROOKLYN, NEW YORK, ASSIGNOR, BY MESNE ASSIGNMENTS, TO THE BATE REFRIGERATING COMPANY.

REFRIGERATING-CARS.

Specification forming part of Letters Patent No. 146,980, dated February 3, 1874; Reissue No. 5,942, dated June 30, 1874; Reissue No. 7,279, dated August 29, 1876; application filed August 2, 1876.

*To all whom it may concern:*

Be it known that I, JOHN J. BATE, of Brooklyn, in the county of Kings and State of New York, have invented certain Improvements in Refrigerating Cars, Chambers, Houses, &c., of which the following is a specification:

The object of my invention is to provide a more equal distribution and consequent diffusion of cool or refrigerated air throughout a car, chamber, or house used for the preservation and storage of animal and vegetable substances—such, for example, as articles of food—than has hitherto been secured.

My invention consists in the combination, within a car, chamber, or house, of an ice-box, through which an artificial air blast or current is forced in contact with the ice contained in the said box; a series of inlet-openings connected with the ice-box, and situated in different parts of the chamber, so that the air in the chamber, after being forced through the ice by the artificial air blast or current, will be distributed and drawn toward said inlet-openings, and hence to all portions of the room, and will be then returned again through the ice-box.

My invention also consists in the combination, within a car, chamber, or house, of an ice-box, through which an artificial air blast or current is forced in contact with the ice contained in said box, of a series of inlet-openings arranged in different portions of the chamber; and also in combination with a series of outlet-openings from said box, arranged in different and opposite portions of the chamber, by which the cooled air forced through said ice-box will be distributed, and all of the materials stored therein cooled.

Figure 1:
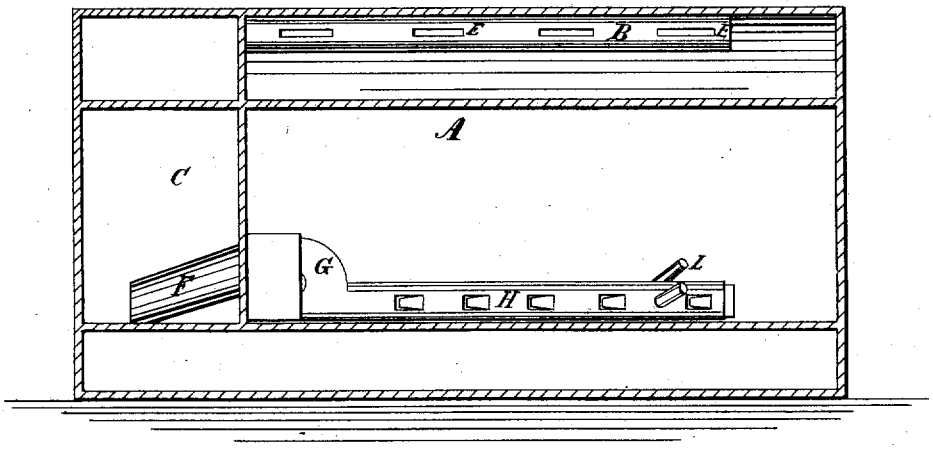
Figure 2:
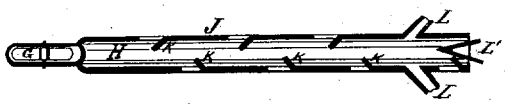

The drawings herewith show, Figure 1, a view of the interior of a car, the side thereof being removed; and Fig. 2, a view of a pipe or distributing channel-way, in connection with a pump, the top of the pipe having also been removed.

I prefer to arrange the inlet-openings connected with the ice-box in the top or upper part of the car or chamber A, the connection between said inlet-openings and the ice-box being effected by a suitable pipe, B. It will be noticed that this pipe conducts the air from the interior of the car to the ice chamber C, and that it is open at the end D, and that it is provided with openings or slots, as at E. In this pipe or connection from the openings to the ice-chamber a slide may be fitted, and in some instances will be necessary. This slide may be on the interior or exterior of the pipe D, and operated in any convenient manner. It should be provided with openings or slots of the size of those marked E, and should register therewith, so that the size of the air-openings may be controlled at pleasure. Said slide is, however, not claimed in this division, it being the subject of claim in a separate division of this reissue, applied for simultaneously herewith. Through the ice box or chamber C the air is drawn by a pump or forcing apparatus, G, and is forced through the channel-way H, and out through openings therein connected with the ice-box, and arranged in different parts of the chamber, so as to secure more equal distribution and diffusion of the cooled air. The distributing channel-way has, therefore, openings J. These may be guarded on the inside of the pipe by deflectors K, said deflecting-plates being formed, when thin or soft metal is used, by the tongues or portions of the pipe forced in by a die or punch which makes the openings J. When the distributing-pipe or channel-way is of other material, deflecting-plates are otherwise applied. These openings may be capped by branch pipes, as shown at L, and the ends of the main pipes closed or left open, and provided with deflecting-plates L′, each and all of which will to a greater or less extent accomplish the object which I have in view to break up and equally distribute the air throughout the car. In this division of this reissue, however, I make no claim to the deflectors referred to, as they are the subject of claim in a separate division, filed simultaneously herewith.

The arrangement of means for refrigerating provision-chambers of cars may be applied to like chambers of ware or provision houses, and chambers for keeping meats and provisions generally. When so adapted the fan-blower may be operated by any motive power at hand or mechanical device convenient, among which may be included clock-movements.

It will be apparent that by means of the distribution of the outlet-openings from the ice-box in various parts of the chamber, cooled air will be more evenly distributed, and also, by reason of the arrangement of inlet-openings in various portions of the chamber, a draft of cooled air from the ice-box will be drawn toward all parts of the chamber where said inlet-openings are situated, in whatever manner the cooled air may be discharged from the ice-box. It is also apparent that by placing the outlet and inlet openings in various parts of the chamber, but as far as possible opposite to each other, the equal distribution of the cooled air will be still further effected.

What I claim as my invention is—

1. The combination, within a closed car, chamber, or house, of an ice box or chamber, mechanical means for inducing an air blast or current through the ice, inlet-openings connected with the ice-box, and arranged in different parts of the chamber, so that the air in the chamber, after passing through the ice-box, will be distributed and drawn to all portions of the room, to be returned again through the ice-box, substantially as described.

2. The combination, within a closed car, chamber, or house, of an ice box or chamber, mechanical means for inducing an air blast or current through the ice, inlet-openings connected with the ice-box, and arranged in different parts of the chamber, outlet-openings, also connected with the ice-box, and arranged in different parts of the chamber opposite to said inlet-openings, so that the air in the chamber, after passing through the ice-box, will be distributed to all portions of the room, substantially as described.

3. In combination with a closed refrigerating-chamber, an ice-box open above and below, and provided with an inlet conduit tube or pipe, for drawing the air to be cooled from different points in the cooling-chamber at a distance from the ice-box.

JOHN J. BATE.

Witnesses:

FREDERIC H. BETTS,

T. J. W. ROBERTSON.